J. H. COOPER.
FUEL PULVERIZING APPARATUS.
APPLICATION FILED APR. 7, 1919.

1,388,551.

Patented Aug. 23, 1921.
3 SHEETS—SHEET 1.

Inventor:
Joseph H. Cooper
By H. G. Rockwell
Atty.

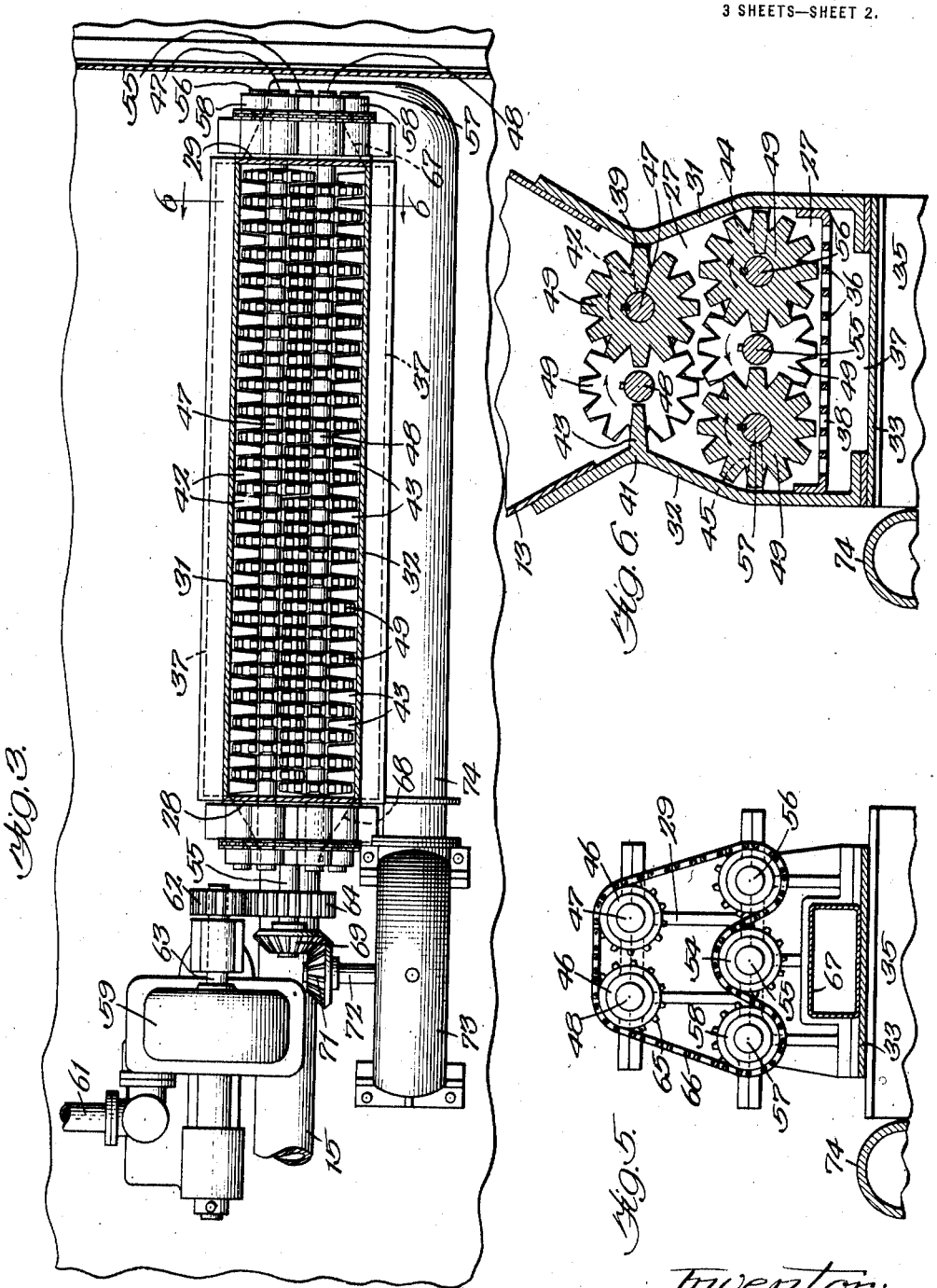

J. H. COOPER.
FUEL PULVERIZING APPARATUS.
APPLICATION FILED APR. 7, 1919.
1,388,551.
Patented Aug. 23, 1921.
3 SHEETS—SHEET 3.
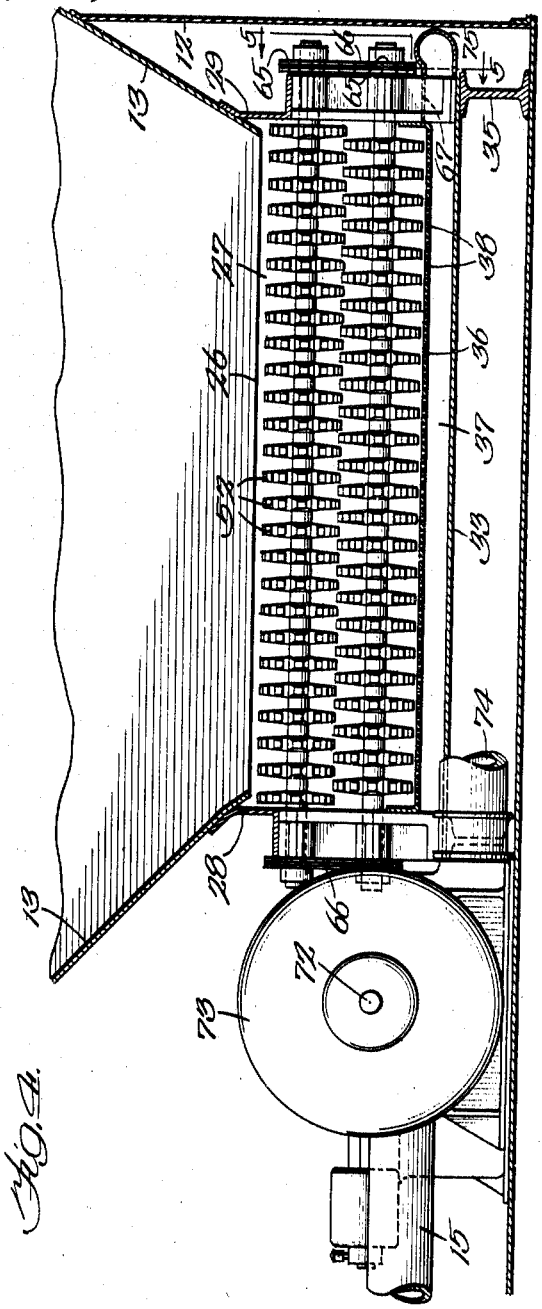
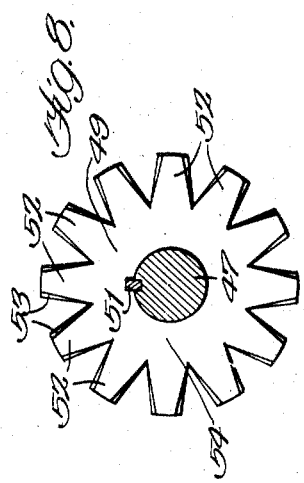
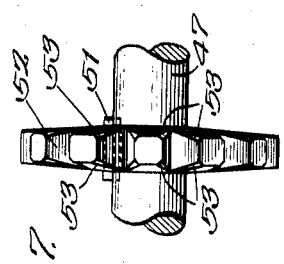
Inventor:
Joseph H. Cooper
By H. W. Rockwell
Atty.

UNITED STATES PATENT OFFICE.

JOSEPH H. COOPER, OF CHICAGO, ILLINOIS.

FUEL-PULVERIZING APPARATUS.

1,388,551. Specification of Letters Patent. Patented Aug. 23, 1921.

Original application filed July 20, 1918, Serial No. 245,803. Divided and this application filed April 7, 1919. Serial No. 288,007.

*To all whom it may concern:*

Be it known that I, JOSEPH H. COOPER, a citizen of the United States, residing at Chicago, in the county of Cook and State of Illinois, have invented certain new and useful Improvements in Fuel-Pulverizing Apparatus, of which the following is a specification.

My invention relates to fuel pulverizing apparatus and is a division of my co-pending application Serial No. 245,803, filed July 20, 1918. It has for its primary object the provision of improved apparatus for pulverizing coal, lignite, peat and the like whereby the fuel dust produced may be distributed directly from the pulverizing chamber uniformly over a large area. Another object is to provide improved fuel pulverizing apparatus constructed and arranged for discharging its product directly into an air feeding conduit independent of the hopper and pulverizing chamber of the apparatus. A further object lies in the provision of a compact arrangement and durable construction for fuel pulverizing apparatus.

Other objects and advantages of the invention will appear from the following description, taken in conjunction with the accompanying drawings which form a part of this specification and illustrate the preferred embodiment of the mechanical features of the invention.

The apparatus of the drawings illustrates the invention as adapted for use on locomotives, though it may be advantageously employed in stationary heating plants.

In the drawings:

Fig. 3 is an enlarged fragmentary section taken approximately on line 3—3 of Fig. 1 and illustrating the fuel pulverizing and fuel and air mixing apparatus.

Fig. 4 is a side elevation of the apparatus shown in Fig. 3 with parts broken away and other parts in vertical section for better illustration of details.

Fig. 5 is a section on line 5—5 of Fig. 4.

Fig. 6 is a section on line 6—6 of Fig. 3.

Fig. 7 is an edge view of one of the pulverizing disks employed, illustrating a portion of the shaft on which it is mounted and Fig. 8 is a side view thereof.

For convenience in description coal will be considered hereinafter as the fuel being used, though it is to be understood that the invention is adapted to the utilization of other fuels.

Figure 1:
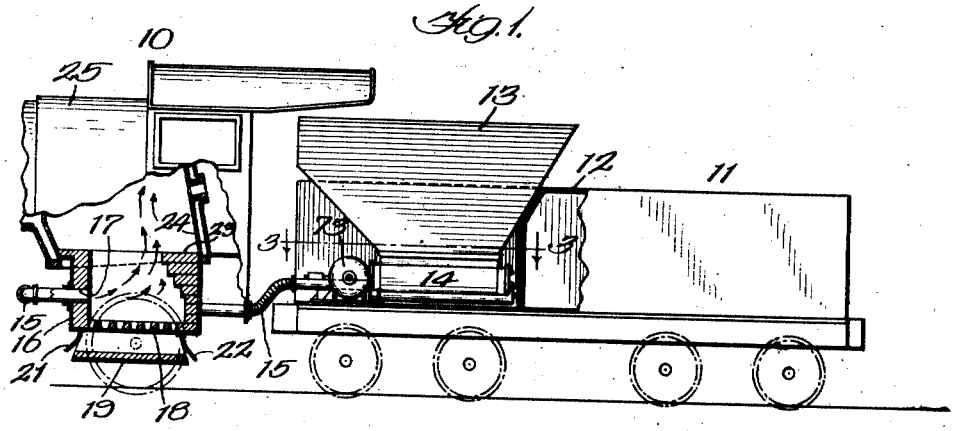
Figure 1 is a fragmentary side elevation of a locomotive and its tender embodying the present invention, portions being broken away and parts shown in vertical section for clearness.
Figure 2:
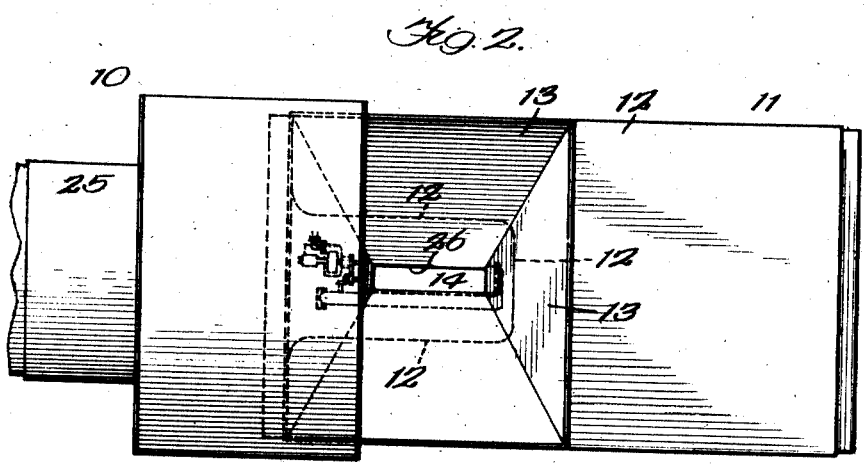
Fig. 2 is a top plan of Fig. 1.

Reference numeral 10 indicates generally a railway locomotive having its tender generally indicated at 11. In addition to a water tank 12, the tender 11 has an open hopper 13 for lump coal which discharges by gravity into a pulverizing and feeding apparatus generally indicated at 14 in Fig. 1 and from which pulverized coal passes through a feed pipe 15 into the locomotive fire-box 16, through an aperture 17 provided in the forward wall of the fire-box. The fire-box may be of any suitable construction for burning pulverized fuel and comprises preferably a grate 18 beneath which depends a cinder hopper 19 having front and rear doors 21 and 22 respectively. Preferably also the rear wall of the fire-box is forwardly projected as at 23 to form an arch whereby the flame from fuel entering the fire-box through aperture 17 is directed upwardly and forwardly so that it has no gouging effect upon the back sheet 24 of the locomotive boiler 25. The bottom of feed hopper 13 discharges through a forwardly and backwardly elongated aperture 26 into a pulverizing chamber 27 defined by front and rear end walls 28 and 29, side walls 31 and 32 and a bottom sheet 33; the hopper and pulverizing chamber being supported on the bed 34 of the tender in any suitable manner, for instance by I-beams 35 shown in Fig. 1. The lower portion of the pulverizing chamber is partitioned off by means of a horizontal screen 36 to form an air chamber 37 which is of shallow depth and rectangular in outline as seen in dotted lines in Fig. 3. Preferably the screen 36 comprises a web of sheet metal perforated by slits 38 which in ordinary practice are one inch long by 1/100 of an inch in width.

The side walls 31 and 32 are contracted as at 39 and 41. Spaced, horizontally disposed arms 42 project inwardly from wall 31 at its contracted portion 39 and stand in staggered relation to similar arms 43 which project inwardly from wall 32 in the same plane at the contracted portion 41. Similarly spaced horizontal arms 44 project inwardly from wall 31 near the bottom of pulverizing chamber 27, and oppositely alined with them in the same horizontal plane are similar arms 45 projecting inwardly of the pulverizing chamber from wall 32; arms 44 and 45 being positioned in the upper portion of the widest part of the pulverizing chamber.

Mounted in suitable bearings 46 carried by the end walls 28 and 29 of the pulverizing chamber, and with their axes in the plane of arms 42 and 43, are a pair of parallel shafts 47 and 48 which respectively traverse the inner ends of arms 42 and 43 and are spaced very slightly from the ends of those arms. Each shaft carries a plurality of pulverizing disks 49 each secured upon its shaft by a key 51 and comprising regularly spaced, radially extending, spur-like projections 52 between which lumps of coal from hopper 13 fall and are carried. Each of the projections 52 is frusto-pyramidal and has its corners beveled deeply as at 53 at its outer end, said beveling tapering to practically nothing at the meeting point of adjacent projections. The base of each projection is, of course, integrally merged with the central hub portion of the disk, and the outer end of each projection is preferably curved cylindrically about the axis of the disk, the arms 42, as well as the arms 43, are spaced from each other substantially the thickness of one disk 49, and the shafts 47 and 48 are each provided with as many disks as there are interstices between arms 42 and 43, the disks fitting closely between the arms and being spaced apart to fit closely between each other. Also the spacing of shafts 47 and 48 from each other is such that the ends of the projections are very close to the opposite shaft in each instance. The close interfitting of these parts results in a very fine initial crushing of the lump coal carried in hopper 13.

Mounted in suitable bearings 54 in the front and rear walls of the pulverizing chamber, positioned centrally of that chamber, and below and in parallelism with shafts 47 and 48, is a driving shaft 55; and on either side of the driving shaft and in a common plane with that shaft and the arms 44 and 45, are a pair of shafts 56 and 57 carried in suitable bearings 58 in the front and rear walls of the pulverizing chamber. Each of the shafts, 55, 56 and 57 is provided with disks 49, the disks of shaft 55 interfitting on opposite sides of that shaft with the disks on shafts 56 and 57, and the disks on the latter two shafts interfitting with the arms 44 and 45 respectively. The spacing of shafts 55, 56 and 57 is also such that there is very little space between the ends of the projections 52 of one shaft and the surface of the adjacent shaft. Preferably the shafts 47 and 48 are so positioned and spaced above shafts 55, 56 and 57 that the peripheries of the disks on shafts 47 and 48 dip below the horizontal plane tangent to the peripheries of the disks on the other three shafts as seen in Fig. 6, so that fuel thrown downwardly from either of the upper sets of disks traverses a very short path before it is caught by the three lower sets of pulverizing disks. Preferably also shafts 55, 56 and 57 are so positioned as to bring the peripheries of their respective disks 49 very close to the upper surface of the screen 36 in order to prevent any appreciable accumulation of fuel dust upon the screen.

A steam turbine, indicated at 59 and fed through a steam pipe 61, drives a pinion 62 fixed upon the turbine shaft 63, the pinion meshing with a gear 64 keyed upon shaft 55. The turbine and other parts just enumerated are located just in front of the forward end of the pulverizing chamber. The ends of shafts 47, 48, 55 56 and 57, outside the front and rear end walls 28 and 29, carry each a sprocket wheel 65, and an endless chain 66 at each end of the chamber passes over the sprocket wheel of shaft 55 and downwardly therefrom under and around the sprocket wheels of shafts 56 and 57 and thence upwardly over the sprocket wheels of shafts 47 and 48. Preferably shaft 55 rotates counter clockwise as shown by its arrow in Fig. 6, while the chain 66 causes the other shafts 47, 48, 56 and 57 to rotate clockwise.

At its rear end the feeding chamber 37 is formed with a straight walled, forwardly diverging, inlet passage 67; and the forward end of the feeding chamber terminates in a straight walled, forwardly tapering, outlet passage 68. A bevel gear 69 keyed to the forward end of shaft 55, meshes with a bevel gear 71 keyed upon the operating shaft 72 of a rotary fan 73, the delivery pipe 74 of which passes backwardly along the bed 34 of the tender to the rear end of the pulverizing chamber where, by means of a suitably shaped conduit 75, it communicates with the rear end of the inlet passage 67 of the feeding chamber. The outlet passage 68 of the feeding chamber discharges into the fuel feed pipe 15.

In the operation of the invention, lump coal is dumped into the hopper 13 and rests upon the disks 49 of the shafts 47 and 48 as well as on the arms 42 and 43. Application of steam to the turbine 59 revolves shaft 55 and the other four shafts driven therefrom by the chains 66, the directions of rotation being preferably as indicated by the curved arrows in Fig. 6. The coal is pulverized between the whirling projections 52 of adjacent shafts and also between those projections and the arms 42 and 43. The coal pulverized by shafts 47 and 48 drops onto the three sets of disks carried by shafts 55, 56 and 57 and onto arms 44 and 45, where it is more finely pulverized and from which it drops upon screen 36. While the direction of rotation of the upper disks is such that coal being crushed is initially carried to the right in Fig. 6 toward wall 31, the rapid whirling of all of the disks together with the reverse rotation of those disks keyed upon shaft 55 distributes the fuel between the three lower sets of disks; and, after the crushing effect of these latter disks is complete, the resulting fuel dust is evenly distributed by these three lower sets of disks over the screen 36. The force of gravity, aided by the vibrations set up by the action of the pulverizing disks and the rotation of the three lower sets of disks very close to the upper surface of the screen, feeds fuel dust constantly through the slits 38 of the screen into the forwardly moving current of air passing continuously through the air chamber 37. It is to be noted that hopper 13 and pulverizing chamber 27 form no part of the air feeding conduit and that, due to the mass of coal constantly present in the hopper and pulverizing chamber the air, taking the path of least resistance, passes from end to end of the air chamber 37, neither blowing upwardly through the screen nor causing any appreciable down draft through it. Were the hopper and chamber 27 arranged in series with the air feeding conduit, as a part thereof, the air would pass freely down through the coal and screen at only a few points, perhaps only at one side of the hopper and chamber, while the mass of coal would restrict or prevent passage of air through the remainder of the screen. This would prevent uniform distribution of coal from all parts of the screen into the air chamber 37 and result in uneven feeding of fuel to the fire-box and the consequent, well known, hindrance to economical firing. Because of the even distribution of the dust over the screen 36, a uniform distribution of fuel dust through this current of air is effected. Because of the forwardly diverging character of the side walls of the inlet passage 67, the feeding air passes with uniform velocity and in uniform volume beneath the whole area of screen 36 and in its passage is permeated with a uniformly distributed mass of powdered fuel. The converging side walls of outlet passage 68, at the forward end of the feeding chamber, operate to change the cross-sectional contour of the current of feeding air from a horizontally attenuated rectangle to a circle in pipe 15, and this change of contour sets up in a positive manner many rapidly interweaving currents of dust laden air in feed pipe 15, so that the distribution of pulverized fuel in the feeding air is maintained uniform from the feeding chamber 37 to the fire-box 16. This is of course a great advantage in firing any heating plant, as it reduces to a minimum fluctuations in temperature occuring in the fire-box. By making the projections 52 of the disks 49 frusto-pyramidal and by beveling their edges as at 53, the lump coal is readily and with great violence struck and pulverized between these projections and the arms 42 and 44. In this operation also the arms 43 and 45 are brought into action by reason of the fact that some of the coal is thrown upwardly toward wall 32 and the last mentioned arms by the actions of the disks on shafts 48 and 57. The beveled surfaces of the projections 53 operate as wedging elements to pinch lumps of coal between these projections and the arms and also between the projections of contiguous disks on different shafts. The fuel laden air passing from feed pipe 15 through aperture 17 into the fire-box is there ignited and employed for heating the boiler 25.

Various features of utility result from the herein described apparatus. One of these is that the apparatus herein described is applicable both to stationary heating plants as well as to railway locomotives and other movable heating plants. A further feature of utility incident to the even distribution of the fuel through its feeding air and consequent uniformity of fuel produced, lies in the fact that the life of the heating plant operated in accordance with the present invention is greatly prolonged, inasmuch as the various metal parts of the plant are not subjected to frequent and rapid fluctuations in temperature with the consequent expansions and contractions which are conducive to crystallization and weakening of the metal. By gearing the pulverizing apparatus directly to the fan producing the feeding air, a synchronous fluctuation of the amount of fuel powdered and the amount of feeding air compressed results, so that the single operation of controlling the steam passing to the turbine 59 governs the amount of fuel fed to the fire-box while leaving the proportions of air and fuel constant in feed pipe 15.

I claim:

1. In a fuel pulverizer, the combination with spaced pulverizing disks each comprising a hub and a plurality of radially extending frusto-pyramidal projections, of a shaft upon which said disks are fixed, and a rigid wedge shaped arm positioned between said disks and substantially filling the space defined by the disks and the shaft.

2. In a fuel pulverizer, the combination of a plurality of parallel shafts, a series of pulverizing disks mounted upon each shaft in spaced relation, each disk comprising a hub and a plurality of radially extending frusto-pyramidal projections, and an arm projecting radially toward said shafts between adjacent disks and substantially filling the space between said disks.

3. In a fuel pulverizer, the combination of a chamber, a plurality of shafts extending in parallel relation longitudinally of said chamber, a series of pulverizing disks mounted on each shaft, each disk comprising a hub and a plurality of radially disposed projections, the disks on one shaft being disposed between and overlapping the disks on another shaft, and a series of arms projecting from the walls of said chamber inwardly toward and in proximity to said shafts between adjacent disks to substantially fill the spaces defined by said disks and said shafts.

4. In a fuel pulverizer, the combination of a fuel chamber, a plurality of shafts extending longitudinally thereof, a series of pulverizing disks mounted on each shaft, each disk comprising a hub and a plurality of radially disposed tapered projections, the disks on one shaft being arranged in overlapping relation with respect to the disks on another shaft, and the space between each shaft and the adjacent wall of the chamber being substantially filled by arms projecting from the walls of said chamber toward said shafts between adjacent disks.

JOSEPH H. COOPER.